(12) United States Patent
Toyama

(10) Patent No.: US 11,879,276 B2
(45) Date of Patent: Jan. 23, 2024

(54) DOOR HANDLE DEVICE FOR VEHICLE

(71) Applicant: ALPHA CORPORATION, Kanagawa (JP)

(72) Inventor: Takao Toyama, Yokohama (JP)

(73) Assignee: ALPHA CORPORATION, Kanagawa (JP)

( * ) Notice: Subject to any disclaimer, the term of this patent is extended or adjusted under 35 U.S.C. 154(b) by 212 days.

(21) Appl. No.: 17/393,190

(22) Filed: Aug. 3, 2021

(65) Prior Publication Data
US 2021/0381284 A1 Dec. 9, 2021

Related U.S. Application Data

(63) Continuation of application No. PCT/JP2020/003939, filed on Feb. 3, 2020.

(30) Foreign Application Priority Data

Feb. 4, 2019 (JP) ................................. 2019-017939

(51) Int. Cl.
*E05B 77/02* (2014.01)
*E05B 85/10* (2014.01)
(Continued)

(52) U.S. Cl.
CPC ............. *E05B 77/06* (2013.01); *B60J 5/0468* (2013.01); *E05B 85/107* (2013.01); *E05B 85/16* (2013.01); *Y10S 292/22* (2013.01)

(58) Field of Classification Search
CPC ...... E05B 85/103; E05B 85/107; E05B 77/02; E05B 77/04; E05B 77/06; Y10S 292/22
See application file for complete search history.

(56) References Cited

U.S. PATENT DOCUMENTS

| 5,123,687 A | 6/1992 | Pfeiffer et al. |
| 8,424,936 B2 * | 4/2013 | Muller .................... E05B 77/06 292/336.3 |

(Continued)

FOREIGN PATENT DOCUMENTS

| CN | 108193961 A | 6/2018 | |
| DE | 102005002493 A1 * | 7/2006 | ............. B60R 25/20 |

(Continued)

OTHER PUBLICATIONS

The extended European search report issued by the European Patent Office on Sep. 13, 2022, which corresponds to European Patent Application No. 20752905.8-1005 and is related to U.S. Appl. No. 17/393,190.

(Continued)

*Primary Examiner* — Carlos Lugo
(74) *Attorney, Agent, or Firm* — Studebaker & Brackett PC

(57) ABSTRACT

A door handle device for a vehicle includes a handle base including an inertia stopper and an operation handle including a stopper protruding portion. The operation handle is movable from an initial position to a use position and to a latch operation position. The inertia stopper has two stopper surfaces and is to rotate from a standby position to a regulation position due to inertia when a collision force is applied to the vehicle. The stopper protruding portion includes a first stopper to, when the operation handle is at the initial position, limit a movement of the operation handle toward the use position by abutting against one of the stopper surfaces, and a second stopper to, when the operation handle is at the use position, limit the movement of the operation handle toward the latch operation position by abutting against another one of the stopper surfaces.

5 Claims, 8 Drawing Sheets

(51) Int. Cl.
  *E05B 77/06* (2014.01)
  *B60J 5/04* (2006.01)
  *E05B 85/16* (2014.01)

(56) References Cited

U.S. PATENT DOCUMENTS

| | | | |
|---|---|---|---|
| 9,435,146 B2* | 9/2016 | Müller | E05B 77/06 |
| 11,214,994 B2* | 1/2022 | Han | E05B 79/06 |
| 11,624,213 B2* | 4/2023 | Guerin | E05B 85/103 |
| | | | 292/336.3 |
| 2009/0026774 A1* | 1/2009 | Watanabe | E05B 85/16 |
| | | | 292/336.3 |
| 2013/0241215 A1 | 9/2013 | Halliwell et al. | |
| 2014/0145454 A1* | 5/2014 | Da Deppo | E05B 77/06 |
| | | | 292/336.3 |
| 2015/0315826 A1 | 11/2015 | Lang et al. | |
| 2016/0273247 A1 | 9/2016 | Fujiwara | |
| 2017/0030116 A1* | 2/2017 | Ilardo | E05B 77/06 |
| 2018/0274271 A1 | 9/2018 | Och et al. | |
| 2019/0178013 A1 | 6/2019 | Toyama et al. | |
| 2020/0102773 A1* | 4/2020 | Sobecki | E05B 85/103 |

FOREIGN PATENT DOCUMENTS

| | | | | |
|---|---|---|---|---|
| DE | 102017118489 A1 * | 2/2019 | | |
| FR | 2882386 A1 * | 8/2006 | | E05B 77/06 |
| JP | 2010-275734 A | 12/2010 | | |
| JP | 2015-090028 A | 5/2015 | | |
| WO | WO-2014203930 A1 * | 12/2014 | | E05B 77/06 |
| WO | 2015/074020 A1 | 5/2015 | | |
| WO | 2018/038177 A1 | 3/2018 | | |

OTHER PUBLICATIONS

International Search Report issued in PCT/JP2020/003939; dated Mar. 24, 2020.

The extended European search report issued by the European Patent Office on Aug. 17, 2023, which corresponds to European U.S. Appl. No. 17/393,190-1005 and is related to U.S. Appl. No. 17/393,190.

* cited by examiner

DOOR HANDLE DEVICE FOR VEHICLE

CROSS-REFERENCE TO RELATED APPLICATION

The present application is a continuation application of PCT/JP2020/003939, which is filed on Feb. 3, 2020, that claims priority to Japanese Patent Application No. 2019-017939 filed on Feb. 4, 2019, the entire content of which is incorporated herein by reference.

TECHNICAL FIELD

The present invention relates to a door handle device for a vehicle.

BACKGROUND

Patent Literature 1 (JP2015-090028A) discloses a door handle device for a vehicle.

In the handle device for a vehicle in Patent Literature 1, an outer handle (an operation handle) connected to a support case (a handle base) is movable from an initial position to a pop-up position by being driven by an electric actuator and to a full-stroke position by being manually operated from the pop-up position, and a latch device attached to a door is released by the operation to the full-stroke position to enable the door to be opened.

An inertia lever to be rotated to a regulation position driven by an inertial force at the time of a side collision of the vehicle, thereby preventing the operation handle from being rotated, is rotatably connected to the handle base so that the latch device will not be inadvertently released when an operation force applied in an opening operation direction is generated in the operation handle by the inertia force at the time of the side collision of the vehicle.

In the handle device for a vehicle in Patent Literature 1, since a rotation regulation of the operation handle by the inertia lever at the time of the side collision is effective only when the operation handle is at the initial position, and does not work when the operation handle is at the pop-up position, when a side collision force is applied in a state in which the operation handle is held at the pop-up position, the operation handle inadvertently rotates to the full stroke position, and the door gets opened.

SUMMARY

Illustrative aspects of the present invention provide a handle device for a vehicle in which it is possible to reliably prevent a door from being inadvertently opened even when a side collision occurs while an operation handle is at a use position.

According to an illustrative aspect of the present invention, a door handle device for a vehicle includes a handle base 1 including an inertia stopper 7 and an operation handle 3 including a stopper protruding portion 4. The operation handle 3 is connected to the handle base 1, is movable from an initial position to a use position, by being driven by an electric actuator, and to a latch operation position, by being manually operated beyond the use position and at which a latch device for a door of the vehicle is operated. The stopper protruding portion 4 is provided on a movable portion to be moved as the operation handle 3 moves. The inertia stopper 7 is configured to rotate about a rotation axis perpendicular to a moving plane in which the stopper protruding portion 4 moves, has two stopper surfaces 5, 6 forming a stepped shape along an axial direction of the rotation axis, and is configured to rotate from a standby position to a regulation position due to inertia when a collision force is applied to the vehicle. The stopper protruding portion 4 includes a first stopper 8 configured to, when the operation handle 3 is at the initial position, limit a movement of the operation handle 3 toward the use position, the movement being generated due to a collision force applied to the vehicle, by abutting against one of the stopper surfaces 5, 6 of the inertia stopper 7 at the regulation position, and a second stopper 9 configured to, when the operation handle 3 is at the use position, limit the movement of the operation handle 3 toward the latch operation position by abutting against another one of the stopper surfaces 5, 6 of the inertia stopper 7 at the regulation position.

Other aspects and advantages of the invention will be apparent from the following description, the drawings and the claims.

BRIEF DESCRIPTION OF DRAWINGS

FIGS. 4A and 4B are cross-sectional views of a main portion illustrating an operation of an operation handle, in which
FIG. 4A is a view illustrating an initial position,
and FIG. 4B is a view illustrating a latch operation position;
FIGS. 5A to 5C are views illustrating a relationship between a second link and a latch release lever, in which
FIG. 5A is an enlarged view of a main portion in FIG. 2,
FIG. 5B is a view taken in a direction of an arrow 5B in FIG. 5A,
and FIG. 5C is a view taken in a direction of an arrow 5C in FIG. 5A;
FIGS. 6A and 6B are cross-sectional views taken along a line 6A-6A in FIG. 5A, in which
FIG. 6A is a view illustrating a use position of the operation handle,
and FIG. 6B is a view illustrating the latch operation position;
FIGS. 7A and 7B are views illustrating an inertia stopper at a standby rotation position, in which
FIG. 7A is a cross-sectional view taken along a line 7A-7A in FIG. 5A,
and FIG. 7B is a cross-sectional view taken along a line 7B-7B in FIG. 5A;
and
FIGS. 8A and 8B are views illustrating the inertia stopper at a stopper rotation position, in which
FIG. 8A is a cross-sectional view taken along the line 7A-7A in FIG. 5A,
and FIG. 8B is a cross-sectional view taken along a line 7B-7B in FIG. 5A.

DESCRIPTION OF EMBODIMENTS

Figure 1:
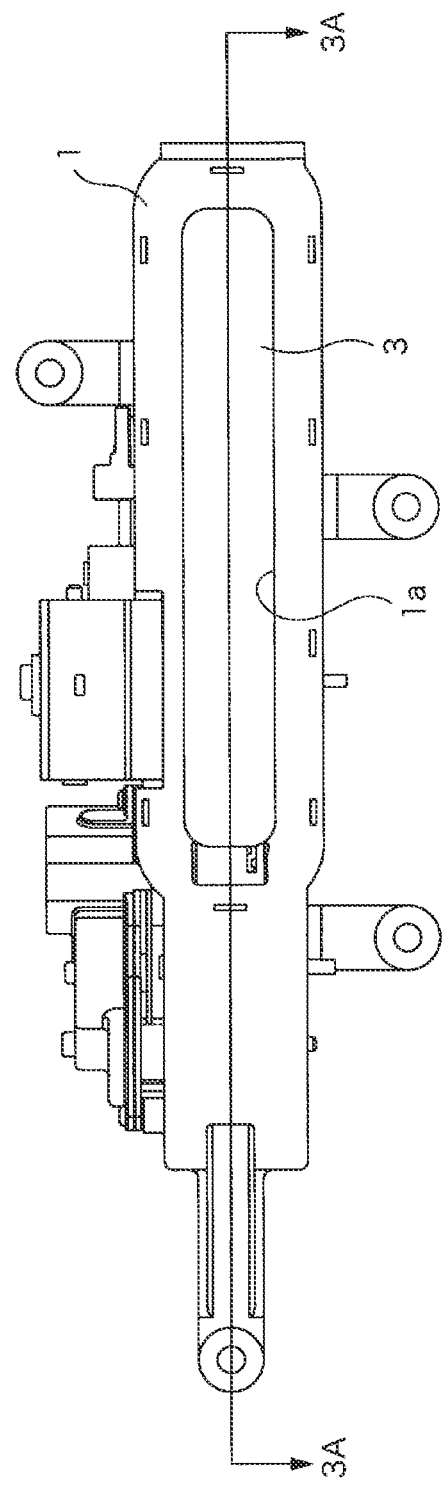
FIG. 1 is a front view of a door handle device.
Figure 2:
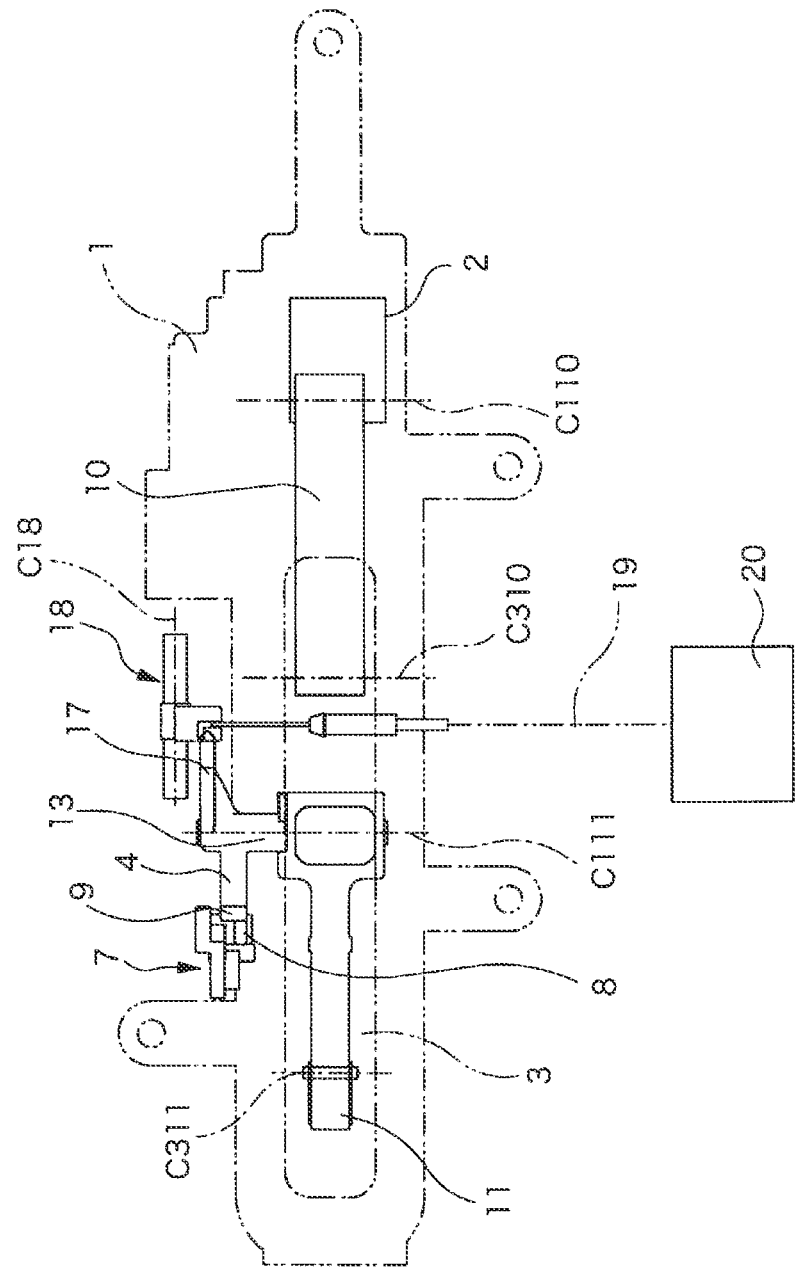
FIG. 2 is a back view of the door handle device.

As illustrated in FIG. 1 and the following drawings, a door handle device includes a handle base 1, an operation handle 3, and a first link 10 and a second link 11 connecting the operation handle 3 to the handle base 1, and is fixed to a door of a vehicle at the handle base 1.

Figure 3:
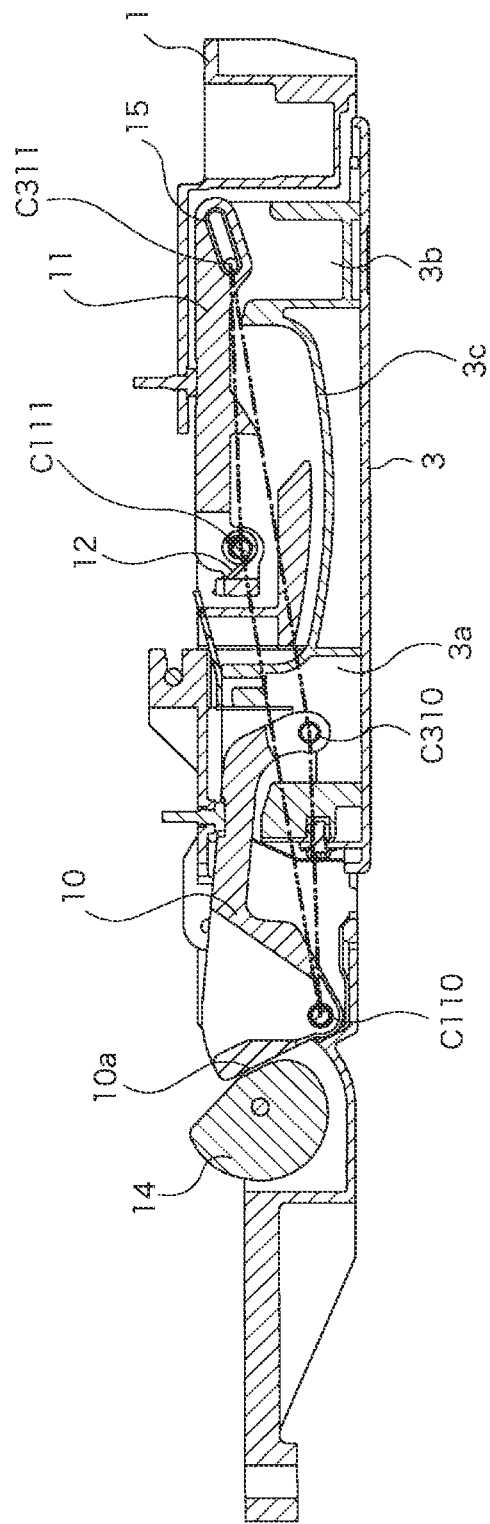
FIG. 3 is a cross-sectional view taken along a line 3A-3A in FIG. 1.
Figure 4A:
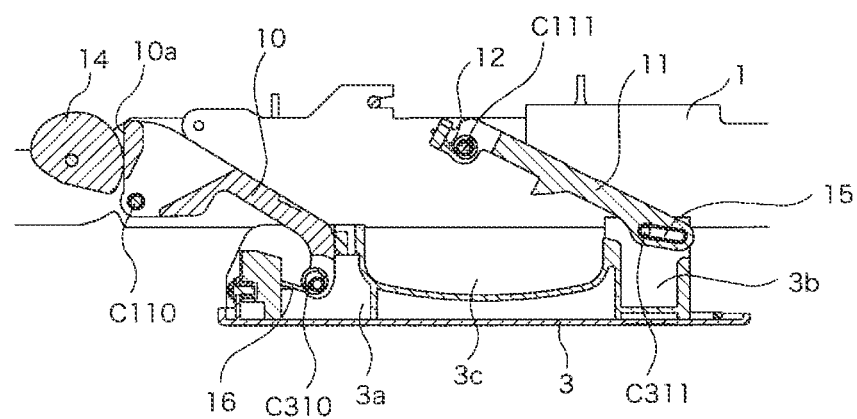
Figure 4B:
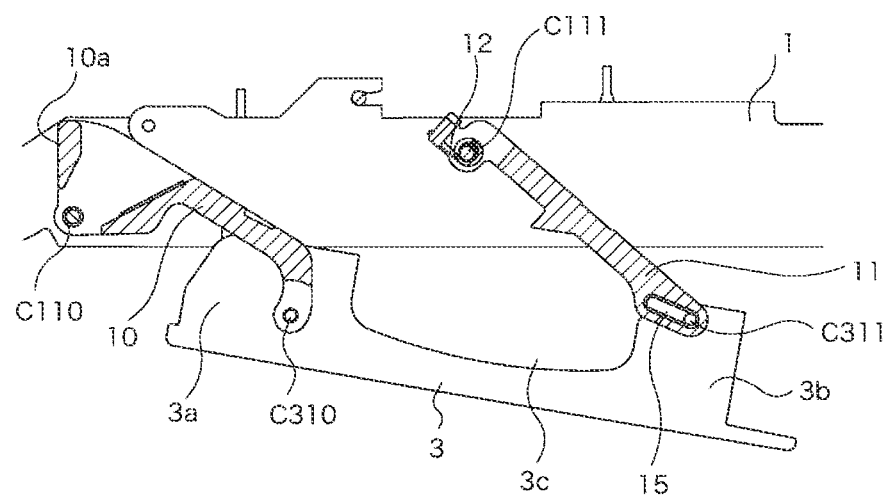

In a state in which the handle base 1 is fixed to the door, the operation handle 3 can be moved from an initial position illustrated in FIGS. 1 and 3, to a use position illustrated in FIG. 4A and to a latch operation position at which one end of the operation handle 3 is pulled further from the use position, as illustrated in FIG. 4B.

The door handle device has a flush surface specification in which, when the operation handle 3 is not in use, the operation handle 3 is accommodated in the door and a surface of the operation handle 3 is substantially in the same plane as a door surface. The initial position of the operation handle 3 corresponds to a non-use posture. The handle base 1 is formed with a handle accommodating recess 1a to accommodate the operation handle 3 at the initial position (see FIGS. 6A and 6B).

As illustrated in FIG. 3, a first link 10 and a second link 11 are connected to the handle base 1 so as to be rotatable about third and fourth rotation centers (C110, C111). The third and fourth rotation centers (C110, C111) of the first link 10 and the second link 11 with respect to the handle base 1 are appropriately spaced apart from each other in a front-rear direction, that is, in a longitudinal direction of the handle base 1. The third rotation center (C110) of the first link 10 is disposed in front of the fourth rotation center (C111) of the second link 11.

In this specification, a left side of FIG. 1 is referred to as "front", a right side is referred to as "rear", a front side of a paper surface of FIG. 1 is referred to as a "front surface" direction, and an opposite direction thereof is referred to a "back surface" direction.

Further, an electric actuator 2 such as a motor is fixed to the handle base 1. A cam surface 10a which is in pressure contact with a cam body 14 which is to be rotationally driven by the electric actuator 2 is formed on the first link 10 and when the cam body 14 is rotationally driven, the first link 10 can be rotated about the third rotation center (C110). An urging force, in a counterclockwise direction in FIG. 3, is applied to the first link 10 by a torsion spring (not illustrated) wound around the third rotation center (C110), and the cam surface 10a is brought into pressure contact with the cam body 14.

The operation handle 3 is provided with link connecting portions 3a, 3b protruding toward a back surface side at both front and rear end portions of the operation handle 3, and a handhold recess 3c serving as a handhold when the operation handle 3 is operated is formed between the link connecting portions 3a, 3b of front and rear portions (see FIGS. 3, 4A, and 4B).

The other end of the first link 10, one end of which is connected to the handle base 1, is rotatably connected to the front link connecting portion 3a of the operation handle 3, and the other end of the second link 11 is connected to the rear link connecting portion 3b.

The second link 11 and the operation handle 3 are rotatably and slidably connected to each other. In this example, a connecting pin, which is fixed to the rear link connection portion 3b and serves as a second rotation center (C311), is inserted into a long hole 15 formed in an end portion of the second link 11. Therefore, the connection pin or the second rotation center (C311) is slidable in the long hole 15. The connecting pin is inserted into the long hole 15 and then retained by retaining means as appropriate.

As illustrated in FIG. 3, the third rotation center (C110) of the first link 10 with respect to the handle base 1, a first rotation center (C310) of the first link 10 with respect to the operation handle 3, the second rotation center (C311) of the second link 11 with respect to the operation handle 3, and the fourth rotation center (C111) of the second link 11 with respect to the handle base 1 are disposed at vertex positions of a parallelogram. In the long hole 15, the position of the connecting pin at the vertex position of the parallelogram is set as one end position (an initial end position), and the long hole 15 extends toward a rear side and a back surface direction, that is, toward a direction in which a link length of the second link 11 can be extended by the connecting pin sliding.

Further, as illustrated in FIGS. 3, 4A, and 4B, by a torsion spring wound around the fourth rotation center (C111) of the handle base 1, the second link 11 is urged toward an initial rotation position side corresponding to the initial position of the operation handle 3. A torsion spring 16 urging the first link 10 toward the initial rotation position side corresponding to the initial position of the operation handle 3 is wound around the first rotation center (C310) of the first link 10 and the operation handle 3 (see FIG. 4A). The torsion spring wound around the fourth rotation center (C111) of the second link 11 and the handle base 1 functions as an end holding spring 12. The end holding spring 12 urges the connecting pin toward the initial end position in the long hole 15, that is, toward a vertex position side of the aforementioned parallelogram, and holds the connecting pin at the initial end position.

Therefore, in this example, when the electric actuator 2 is driven to rotate the cam body 14 counterclockwise in FIG. 3 in a state in which the operation handle 3 is at the initial position illustrated in FIG. 3, the first link 10 rotates clockwise about the third rotation center (C110).

As described above, since the connecting pin of the second link 11 and the operation handle 3 is held at the initial end position at which the link length of the second link 11 is minimized due to the end holding spring 12, the first link 10, the second link 11, the operation handle 3, and the handle base 1 form a parallel crank mechanism having the handle base 1 as a fixed link. Therefore the operation handle 3 moves from the initial position to the use position illustrated in FIG. 4A by the rotation of the first link 10 while maintaining the parallel posture.

When the operation handle 3 reaches the use position, the driving of the electric actuator 2 is stopped by a switch (not illustrated), and the operation handle 3 is held at the use position, and when the electric actuator 2 is reversely driven from this state, the first link 10 returns to the initial rotation position by the torsion spring wound around the third rotation center (C110), and the operation handle 3 returns to the initial position.

At the use position, the operation handle 3 is held in a posture parallel to the door surface, and thereafter, by pulling out a rear end side of the operation handle 3 to an outer side of the door, the operation handle 3 is rotated about the third rotation center (C310) of the first link 10 until the operation handle 3 comes into contact with a stopper (not illustrated), and as illustrated in FIG. 4B, the operation handle 3 can be moved to a latch release position inclined from a front end portion toward the rear end portion.

As illustrated in FIG. 4B, the rotation of the operation handle 3 from the use position to the latch release position is allowed when the connecting pin slides to an opposite end side of the long hole 15 in the long hole 15 and the link length of the second link 11 becomes substantially longer.

The rotation of the operation handle 3 from the use position to the latch release position is performed manually, and the second link 11 further rotates beyond a use rotation position, which corresponds to the use position of the operation handle 3, to the latch release rotation position in accordance with the rotation operation of the operation handle 3 to a latch release rotation position.

Figure 5A:
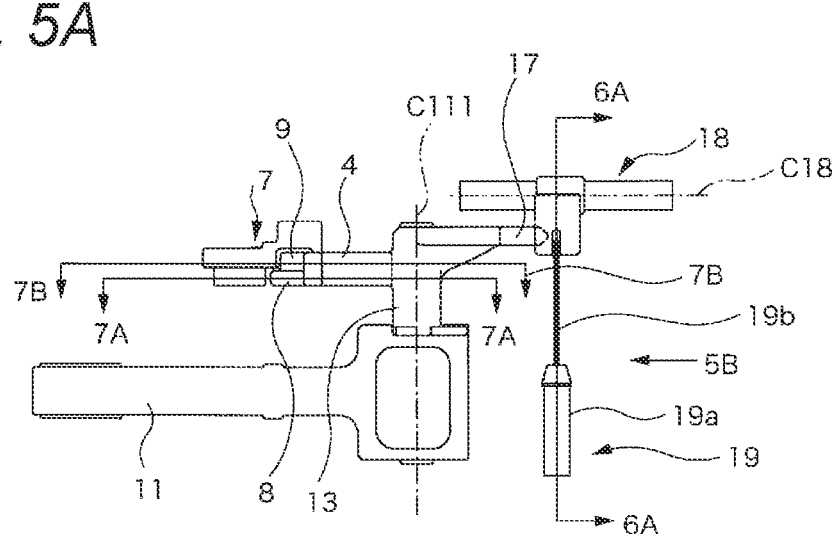
Figure 5B:
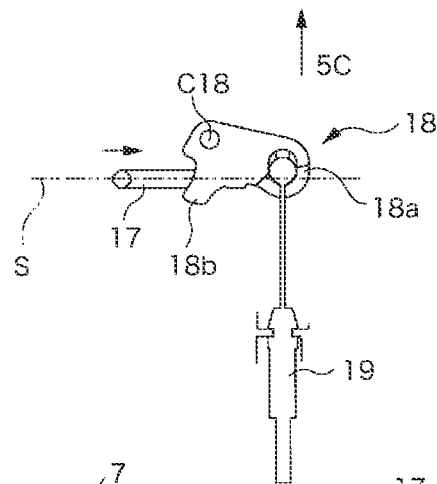
Figure 5C:
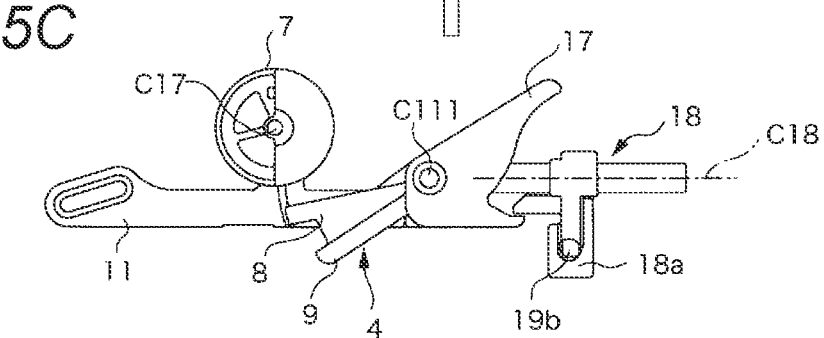

Further, as illustrated in FIGS. 5A to 5C, a support column 13 extending in an axial direction of the rotation center of the second link 11 with respect to the handle base 1 is erected on the second link 11, and a lever operating protruding portion 17 protrudes toward a front side from a distal end of the support column 13.

Meanwhile, the handle base 1 is provided with a latch release lever 18. The latch release lever 18 includes a cable connecting portion 18a and a driven protruding portion 18b, and is attached to the handle base 1 so as to be rotatable about a rotation center (C18) extending in the front-rear direction. The latch release lever 18 is held clockwise in FIG. 5B, that is, at the initial rotation position illustrated in FIG. 5B by a torsion spring (not illustrated) wound around the rotation center (C18).

As illustrated in FIG. 5B, the driven protruding portion 18b of the latch release lever 18 enters an operating plane (S) of the lever operating protruding portion 17 when the second link 11 rotates, and the lever operating protruding portion 17 moves in an arrow direction in FIG. 5B and clockwise in FIG. 5C along with the movement of the operation handle 3 from the initial position to the use position and to the latch release position.

Figure 6A:
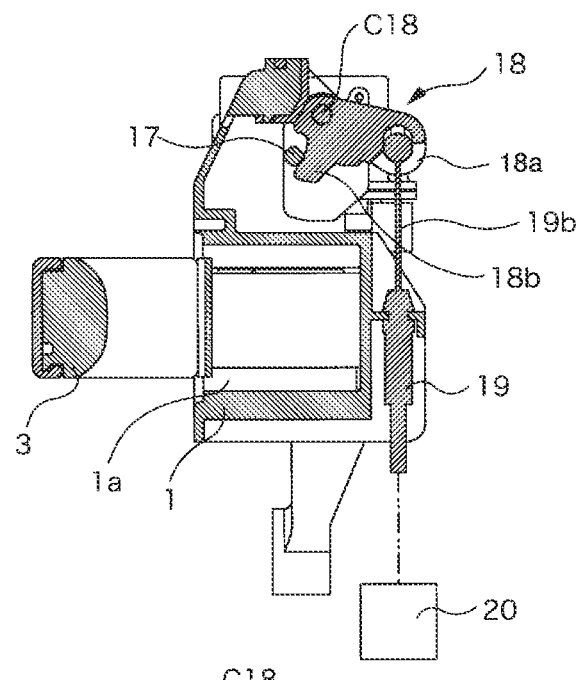

As is clear from FIGS. 5A to 5C illustrating the initial position of the operation handle 3, when the second link 11 is at the initial rotation position, the lever operating protruding portion 17 and the driven protruding portion 18b of the latch release lever 18 do not contact each other, and when the second link 11 is rotated to the use rotation position by operating the operation handle 3 from this state to the use position, the lever operating protruding portion 17 comes into contact with the driven protruding portion 18b as illustrated in FIG. 6A.

Figure 6B:
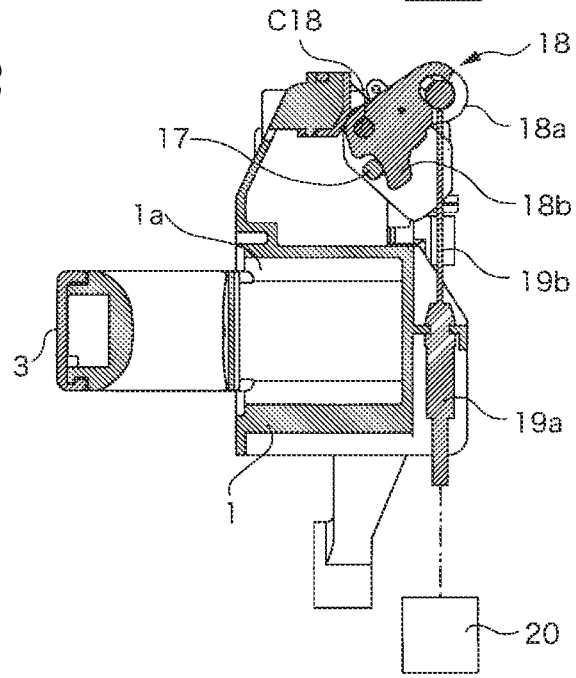

From this state, when the operation handle 3 is rotated to the latch release position and the second link 11 is rotated to the latch release rotation position, as illustrated in FIG. 6B, the lever operating protruding portion 17 pushes the driven protruding portion 18b and rotates counterclockwise about the rotation center (C18) against a reaction force of the torsion spring.

An inner cable 19b of the cable device 19 which is movably inserted into the outer cable 19a is connected to the cable connecting portion 18a of the latch release lever 18. One end of the outer cable 19a of the cable device 19 is fixed to the handle base 1 and the other end thereof is fixed to the door latch device 20 fixed to the door. When the latch release lever 18 rotates, the operation force is transmitted to a door latch device 20 via the inner cable 19b, and a latch release operation is performed.

Further, an inertia stopper mechanism 21 to prevent the door from being opened when a side collision load is applied to the vehicle is incorporated in the handle device. As illustrated in FIGS. 5A to 5C, the inertia stopper mechanism 21 includes a stopper protruding portion 4 protruding from the support column 13 of the second link 11, and an inertia stopper 7 disposed on the handle base 1.

The stopper protruding portion 4 extends in parallel to the lever operating protruding portion 17 described above. The stopper protruding portion 4 protrudes in a direction opposite to a direction in which the lever operating protruding portion 17 extends, that is, rearward. The stopper protruding portion 4 has a wing piece shape. The stopper protruding portion 4 is formed in a stepped shape including a first stopper 8, which is parallel to a side wall surface of the second link 11 and faces the second link 11, and a second stopper 9, which is disposed so as to be accumulated on the first stopper 8 in a direction away from the side wall surface of the second link 11 (see FIGS. 7A, 7B, 8A and 8B).

The stopper protruding portion 4 is fixed to the second link 11. The stopper protruding portion 4 rotates about the fourth rotation center (C111) of the second link 11 along with the rotation of the second link 11. The stopper protruding portion 4 is at an initial corresponding position shown in FIG. 7A when the operation handle 3 is at the initial position, that is, when the second link 11 is at the initial rotation position. The stopper protruding portion 4 moves to a use corresponding position shown in FIG. 7B when the second link 11 is at the use rotation position.

Figure 7A:
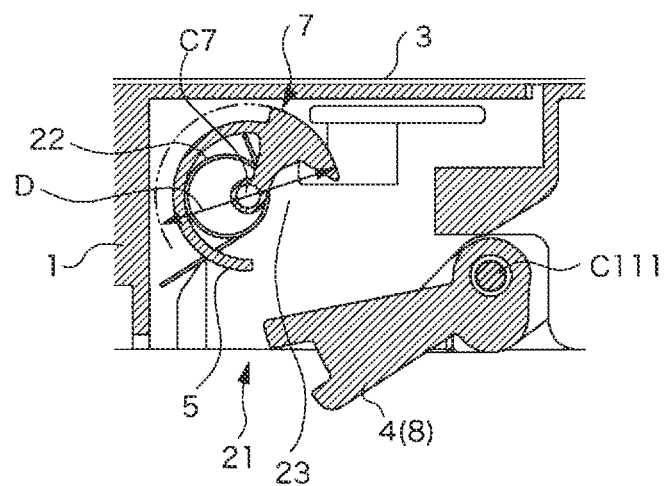
Figure 7B:
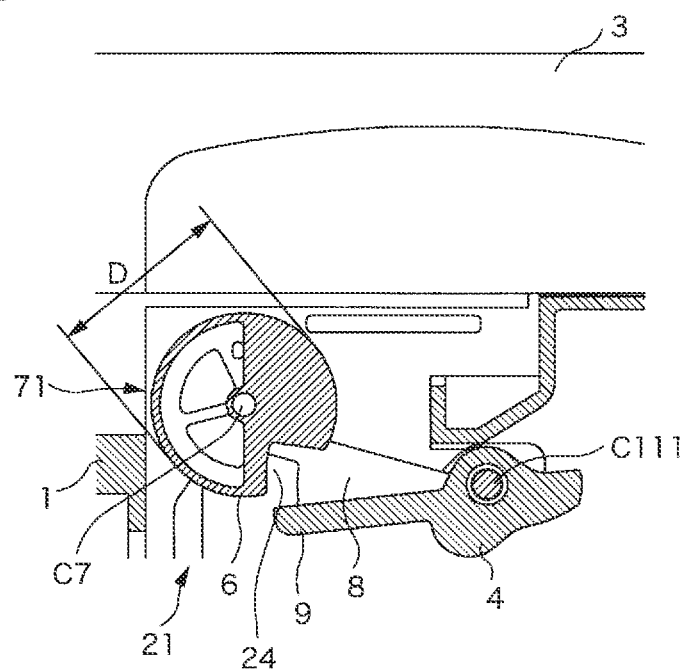
Figure 8A:
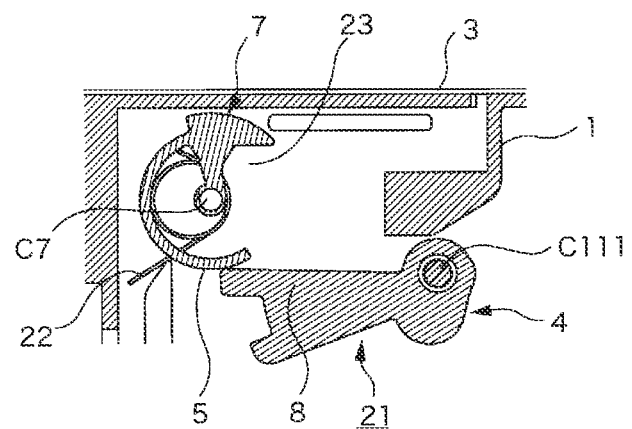
Figure 8B:
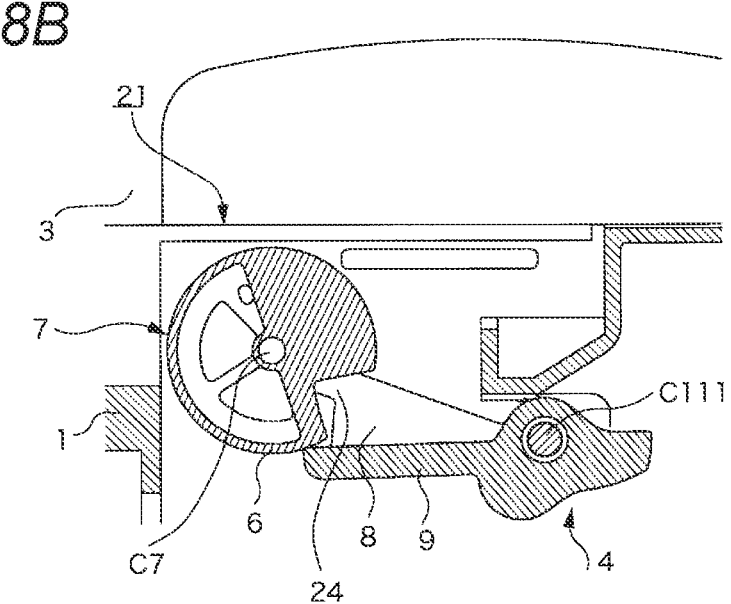

Meanwhile, the inertia stopper 7 is rotatable about a rotation center (C7) between a standby rotation position illustrated in FIGS. 7A and 7B and a stopper rotation position illustrated in FIGS. 8A and 8B. As illustrated in FIG. 7A, the inertia stopper 7 is urged toward a standby rotation position side by a torsion spring 22 wound around the rotation center (C7).

The inertia stopper 7 is formed as a cylindrical body in which a position of the center of gravity is set such that the inertia stopper 7 moves from the standby rotation position to the stopper rotation position due to inertia when a collision force due to a side collision is applied.

Further, the inertia stopper 7 has first and second stopper surfaces 5, 6 formed by utilizing a side wall of the inertia stopper 7. As illustrated in FIG. 7A, the first stopper surface 5 is disposed on a rotation plane of the first stopper 8. The first stopper surface 5 is formed to have a diameter smaller than a diameter (D) of the second stopper surface 6, which is to be described later.

When the inertia stopper 7 is at the standby rotation position, the first stopper surface 5 of the inertia stopper 7 is opened at a position facing the first stopper 8 of the stopper protruding portion 4 which is at the initial corresponding position as illustrated in FIG. 7A, and a gap 23 to allow the first stopper 8 to enter from the opened portion toward inner side is formed. The gap 23 allows the first stopper 8 to move beyond the use corresponding position to a position corresponding to the latch release rotation position of the second link 11.

Meanwhile, when the inertia stopper 7 is at the standby rotation position, the second stopper surface 6 of the inertia stopper 7 is opened at a position facing the second stopper 9 in the use corresponding position as illustrated in FIG. 7B, and is provided with a recess 24 to allow the second stopper 9 to move to a position corresponding to the latch release rotation position of the second link 11.

Therefore, when the inertia stopper 7 is at the standby rotation position, the rotation of the second link 11 is not limited, and the operation handle 3 can be moved to the initial position, the use position, and the latch release position.

On the other hand, when a side collision force of the vehicle is applied, the inertia stopper 7 rotates from the standby rotation position to the stopper rotation position. When the operation handle 3 is at the initial position, a movement path of the first stopper 8 is blocked by the first stopper surface 5 of the inertia stopper 7 as illustrated in FIG. 8A. When the operation handle 3 is at the use position, a movement path of the second stopper 9 is blocked by the second stopper surface 6 of the inertia stopper 7 as illustrated in FIG. 8B, so that the movement is limited.

As a result, regardless of the position of the operation handle 3, it is possible to reliably prevent the second link 11 from moving due to the side collision and the latch release lever 18 from being operated, and the door from being opened unnecessarily.

The operation handle 3 is connected to the handle base 1 fixed to a door, and is movable between the initial position, the use position, to which the operation handle 3 reaches by being driven by the electric actuator 2 from the initial position and at which the operation handle 3 protrudes from a door surface, and the latch operation position beyond the use position. After being driven to the use position by the electric actuator 2, the latch device can be released by manually operating the operation handle 3 to the latch operation position.

The inertia stopper 7 rotates to the regulation position when the collision force such as a side collision is applied to the vehicle. The inertia stopper 7 is to, when the operation handle 3 is at the initial position, face and contact the first stopper 8 of the stopper protruding portion 4, and when the operation handle 3 is at the use position, face and contact the second stopper 9, thereby limiting the movement of the operation handle 3 from the initial position to the use position or from the use position to the latch operation position.

Therefore, in the present invention, when the collision force is applied to the vehicle, the inertia stopper 7 can limit the movement of the operation handle 3 regardless of whether the operation handle 3 is at the initial position or the use position.

Further, since the inertia stopper 7 that limits the operation of the operation handle 3 at both positions is formed by a single member, the number of components can be small and the structure is simplified.

Further, in a case where the inertia stopper 7 is formed by a single member, the inertia stopper 7 normally needs to be disposed in the vicinity of an intermediate position between a position of the first stopper 8 when the operation handle 3 is at the initial position and a position of the second stopper 9 when the operation handle 3 is at the use position. However, in the present invention in which the inertia stopper 7 is formed to have two steps such that each of the steps individually corresponds to the first and second stoppers 8, 9, and distances from a rotation center (C7) of the inertia stopper 7 can be individually set so as to be able to adjust an interval with each of the first and second stoppers 8, 9, a degree of freedom of an arrangement position of the inertia stopper 7 is increased, so that a space can be effectively used.

The door handle device may further include a first link 10 and a second link 11, each of the first and second links 10, 11 having a first end and a second end. The first ends of each of the first and second links 10, 11 may be rotatably connected to the handle base. The operation handle 3 may be rotatably connected to the second ends of each of the first and second links 10, 11, a connection portion at which the second end of the first link 10 and the operation handle 3 are connected with each other having a first rotation center (C310), another connection portion at which the second end of the second link 11 and the operation handle 3 are connected with each other having a second rotation center (C311), the first link may be used as a driving link, and the operation handle 3 may be configured to be operable as a four-bar link mechanism in which a direction in which the operation handle 3 extends is to, when the operation handle 3 is at the use position, be parallel to a direction in which a surface of the door extends. The second rotation center (C311) may be configured to slide from an initial end position along one of the second link 11 and the operation handle 3, and the operation handle 3 may be configured to, when the operation handle 3 is at the use position, rotate about the first rotation center (C310), and to be manually operable toward the latch operation position beyond the use position. The second link 11 may include the stopper protruding portion 4.

In this way, when the operation handle 3 is driven as a four-bar link mechanism having the handle base 1 as a fixed link and the operation handle 3 at the use position is parallel to the door surface, a situation in which only one end of the operation handle 3 protrudes from the door surface can be avoided when the operation handle 3 is at the use position, which can prevent the occurrence of a design discomfort. Furthermore, by limiting the operation of the second link 11, which directly operates the door latch device, by the inertia stopper 7, operation reliability can be improved.

Further, although it is sufficient to dispose the stopper protruding portion 4 at any appropriate position of the movable portion, when the stopper protruding portion 4 includes the first and second stoppers 8, 9 on the movable portion, the first and second stoppers 8, 9 protruding from a support column 13 vertically erected with respect to the moving plane of the movable portion and in parallel with the moving plane of the movable portion, since a stop operation surface can be set at a position away from the moving plane of the movable portion, even when other components are densely disposed in the vicinity of the movable portion, interference with the other components can be reliably prevented, and the operation reliability can be improved.

Further, when the first and second stoppers 8, 9 are configured to protrude from the support column 13, since the respective stoppers can be brought close to the corresponding stopper surfaces 5, 6 of the inertia stopper 7, it is possible to further increase the degree of freedom of the arrangement position of the inertia stopper 7.

In this case, when the support column 13 is formed on a rotation center axis of the second link 11, since a swing width of the stopper protruding portion 4 is reduced, the space can be effectively used.

While the present invention has been described with reference to certain exemplary embodiments thereof, the scope of the present invention is not limited to the exemplary embodiments described above, and it will be understood by those skilled in the art that various changes and modifications may be made therein without departing from the scope of the present invention as defined by the appended claims.

What is claimed is:

1. A door handle device for a vehicle comprising:
   a handle base including an inertia stopper; and
   an operation handle including a stopper protruding portion, wherein the operation handle is connected to the handle base, is movable from an initial position to a use position, by being driven by an electric actuator, and to a latch operation position, by being manually operated beyond the use position and at which a latch device for a door of the vehicle is operated,
   wherein the stopper protruding portion is configured to move as the operation handle moves,
   wherein the inertia stopper is configured to rotate about a rotation axis perpendicular to a moving plane in which the stopper protruding portion moves, has a first stopper surface and a second stopper surface forming a stepped shape along an axial direction of the rotation axis, and is configured to rotate from a standby position to a regulation position due to inertia when a collision force is applied to the vehicle, and
   wherein the stopper protruding portion includes a first stopper and a second stopper,
   wherein the first stopper is configured to, when the operation handle is at the initial position, limit a movement of the operation handle toward the use position generated due to the collision force applied to the vehicle, by abutting against the first stopper surface of the inertia stopper at the regulation position,
   wherein the second stopper is configured to, when the operation handle is at the use position, limit a movement of the operation handle toward the latch operation position generated due to the collision force applied to the vehicle by abutting against the second stopper surface of the inertia stopper at the regulation position wherein the first stopper surface and the second stopper surface are parallel to each other, wherein the first stopper surface is positioned on one side in the axial direction of the rotation axis with respect to the second stopper surface, and wherein the second stopper surface is positioned on another side in the axial direction of the rotation axis with respect to the first stopper surface.

2. The door handle device for a vehicle according to claim 1, further comprising:

a first link and a second link, each of the first and second links having a first end and a second end, wherein the first ends of each of the first and second links are rotatably connected to the handle base, wherein the operation handle is rotatably connected to the second ends of each of the first and second links, a connection portion at which the second end of the first link and the operation handle are connected with each other having a first rotation center, another connection portion at which the second end of the second link and the operation handle are connected with each other having a second rotation center, the first link is used as a driving link, and the operation handle is configured to be operable as a four-bar link mechanism in which a direction in which the operation handle extends is to, when the operation handle is at the use position, be parallel to a direction in which a surface of the door extends, wherein the second rotation center is configured to slide from an initial end position along one of the second link and the operation handle, and the operation handle is configured to, when the operation handle is at the use position, rotate about the first rotation center, and to be manually operable toward the latch operation position beyond the use position, and wherein the second link includes the stopper protruding portion.

3. A door handle device for a vehicle comprising:

a handle base including an inertia stopper; and an operation handle including a stopper protruding portion, wherein the operation handle is connected to the handle base, is movable from an initial position to a use position, by being driven by an electric actuator, and to a latch operation position, by being manually operated beyond the use position and at which a latch device for a door of the vehicle is operated, wherein the stopper protruding portion is disposed on a support column which rotates as the operation handle moves, wherein the stopper protruding portion rotates about an axis of the support column, wherein the inertia stopper is configured to rotate about a rotation axis perpendicular to a moving plane in which the stopper protruding portion moves, has two stopper surfaces forming a stepped shape along an axial direction of the rotation axis, and is configured to rotate from a standby position to a regulation position due to inertia when a collision force is applied to the vehicle, and wherein the stopper protruding portion includes a first stopper configured to, when the operation handle is at the initial position, limit a movement of the operation handle toward the use position, the movement being generated due to the collision force applied to the vehicle, by abutting against one of the stopper surfaces of the inertia stopper at the regulation position, and a second stopper configured to, when the operation handle is at the use position, limit the movement of the operation handle toward the latch operation position by abutting against another one of the stopper surfaces of the inertia stopper at the regulation position, and wherein the first and second stoppers have wing piece shapes protruding from the support column, the support column being vertically erected with respect to a moving plane of the stopper protruding portion, the first and second stoppers being in parallel with the moving plane of the stopper protruding portion.

4. The door handle device for a vehicle according to claim 3, further comprising:

a first link and a second link, each of the first and second links having a first end and a second end, wherein the first ends of each of the first and second links are rotatably connected to the handle base, wherein the operation handle is rotatably connected to the second ends of each of the first and second links, a connection portion at which the second end of the first link and the operation handle are connected with each other having a first rotation center, another connection portion at which the second end of the second link and the operation handle are connected with each other having a second rotation center, the first link is used as a driving link, and the operation handle is configured to be operable as a four-bar link mechanism in which a direction in which the operation handle extends is to, when the operation handle is at the use position, be parallel to a direction in which a surface of the door extends, wherein the second rotation center is configured to slide from an initial end position along one of the second link and the operation handle, and the operation handle is configured to, when the operation handle is at the use position, rotate about the first rotation center, and to be manually operable toward the latch operation position beyond the use position, and wherein the second link includes the stopper protruding portion.

5. The door handle device for a vehicle according to claim 4, wherein the support column is disposed on a rotation center axis of the second link.

* * * * *